United States Patent
Gibson et al.

(10) Patent No.: US 9,527,505 B1
(45) Date of Patent: Dec. 27, 2016

(54) METHODS AND SYSTEM FOR OPERATING A DRIVELINE DISCONNECT CLUTCH

(71) Applicant: Ford Global Technologies, LLC, Dearborn, MI (US)

(72) Inventors: Alexander O'Connor Gibson, Ann Arbor, MI (US); Todd McCullough, Bloomfield Hills, MI (US); Felix Nedorezov, Rochester Hills, MI (US); Akshay Bichkar, Ann Arbor, MI (US); Stuart N. Ford, Farmington Hills, MI (US); Walter Joseph Ortmann, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/744,990

(22) Filed: Jun. 19, 2015

(51) Int. Cl.
| | |
|---|---|
| *B60W 10/02* | (2006.01) |
| *B60W 10/08* | (2006.01) |
| *B60W 20/00* | (2016.01) |
| *B60W 10/06* | (2006.01) |
| *F16D 43/286* | (2006.01) |
| *B60K 6/20* | (2007.10) |

(52) U.S. Cl.
CPC ............ *B60W 20/40* (2013.01); *B60K 6/20* (2013.01); *B60W 10/02* (2013.01); *B60W 10/026* (2013.01); *B60W 10/06* (2013.01); *B60W 10/08* (2013.01); *F16D 43/286* (2013.01); *B60W 2510/0233* (2013.01); *B60W 2510/0638* (2013.01); *B60W 2510/081* (2013.01); *B60W 2510/083* (2013.01); *B60W 2710/021* (2013.01); *B60W 2710/024* (2013.01); *B60W 2710/081* (2013.01); *B60Y 2200/92* (2013.01); *B60Y 2300/42* (2013.01); *B60Y 2300/43* (2013.01)

(58) Field of Classification Search
None
See application file for complete search history.

(56) References Cited

U.S. PATENT DOCUMENTS

| | | | | |
|---|---|---|---|---|
| 6,364,807 | B1 * | 4/2002 | Koneda | B60K 6/48 180/65.25 |
| 8,758,192 | B2 | 6/2014 | Smith et al. | |
| 2006/0135316 | A1 * | 6/2006 | Fujii | F16H 61/061 477/156 |
| 2007/0202989 | A1 * | 8/2007 | Ortmann | B60K 6/387 477/166 |
| 2012/0083952 | A1 | 4/2012 | Smith et al. | |
| 2013/0296123 | A1 | 11/2013 | Doering et al. | |
| 2013/0296132 | A1 | 11/2013 | Doering et al. | |

* cited by examiner

*Primary Examiner* — Edwin A Young
(74) *Attorney, Agent, or Firm* — David Kelley; Alleman Hall McCoy Russell & Tuttle LLP (57) ABSTRACT

Systems and methods for operating a transmission of a hybrid vehicle's driveline are presented. In one example, the systems and methods estimate a driveline disconnect clutch stroke pressure and gain via extending a line from a non-zero driveline disconnect clutch torque capacity to a zero driveline disconnect clutch torque capacity.

20 Claims, 5 Drawing Sheets

METHODS AND SYSTEM FOR OPERATING A DRIVELINE DISCONNECT CLUTCH

FIELD

The present description relates to methods and a system for characterizing and operating a driveline disconnect clutch of a vehicle. The methods and systems may be particularly useful for hybrid vehicles that include an engine that may be selectively coupled to an electric machine via the driveline disconnect clutch.

BACKGROUND AND SUMMARY

A driveline of a hybrid vehicle may include an internal combustion engine, an electric motor, and a transmission to propel the vehicle. The driveline may selectively couple the engine and the electric motor to provide torque to vehicle wheels. The driveline may uncouple the engine and the motor while a driver is demanding a low driver demand torque. By uncoupling the engine and the motor, the engine may be stopped to conserve fuel and the vehicle's kinetic energy while the driveline continues to rotate and provide a lower driver demand torque. The driveline disconnect clutch may be closed to restart the engine after the engine is stopped in response to an increase in driver demand torque or other conditions. If the driveline disconnect clutch transfers more or less torque than is desired from the motor to the engine, the engine may take longer than is desired to start or a driveline torque disturbance may be observed by the driver. Therefore, it would be desirable to provide a way of operating a driveline disconnect clutch so that actual driveline disconnect clutch torque capacity is close to desired driveline disconnect clutch torque capacity.

The inventors herein have recognized the above-mentioned issues and have developed a driveline operating method, comprising: receiving inputs to a controller; operating a driveline disconnect clutch via the controller in response to a clutch stroke pressure, the clutch stroke pressure based on extending a disconnect clutch gain line from a non-zero driveline disconnect clutch torque capacity to zero driveline disconnect clutch torque capacity.

By estimating driveline disconnect clutch stroke pressure based on extending a disconnect clutch gain line from a non-zero driveline disconnect clutch torque capacity to zero driveline disconnect clutch torque capacity, it may be possible to provide the technical result of improved driveline disconnect clutch control. The disconnect clutch gain line when extended to zero driveline disconnect clutch torque capacity, may improve determination of a driveline disconnect clutch application pressure where coulomb friction is overcome and torque transfer to the stopped engine begins. The driveline disconnect clutch application pressure where coulomb friction is overcome may be referred to as the driveline disconnect clutch stroke pressure or clutch stroke pressure. Knowledge of the driveline disconnect clutch application pressure allows a precise amount of application pressure to be supplied to the driveline disconnect clutch without transferring torque to the engine so that the clutch may be prepositioned to respond to a request to start the engine. Further, by providing a good estimate of driveline disconnect clutch stroke pressure, it may be possible to more accurately determine the driveline disconnect clutch's torque transfer capacity (e.g., the maximum amount of torque the driveline disconnect clutch may transfer at the present driveline disconnect clutch application pressure) because it is known where driveline disconnect clutch application pressure in excess of the driveline disconnect clutch stroke pressure increases driveline disconnect clutch torque transfer capacity, at least until a maximum pressure is provided.

The present description may provide several advantages. For example, the approach may provide improved vehicle energy efficiency. Further, the approach may reduce driveline torque disturbances. Additionally, the approach may provide for more predictable engine starting.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
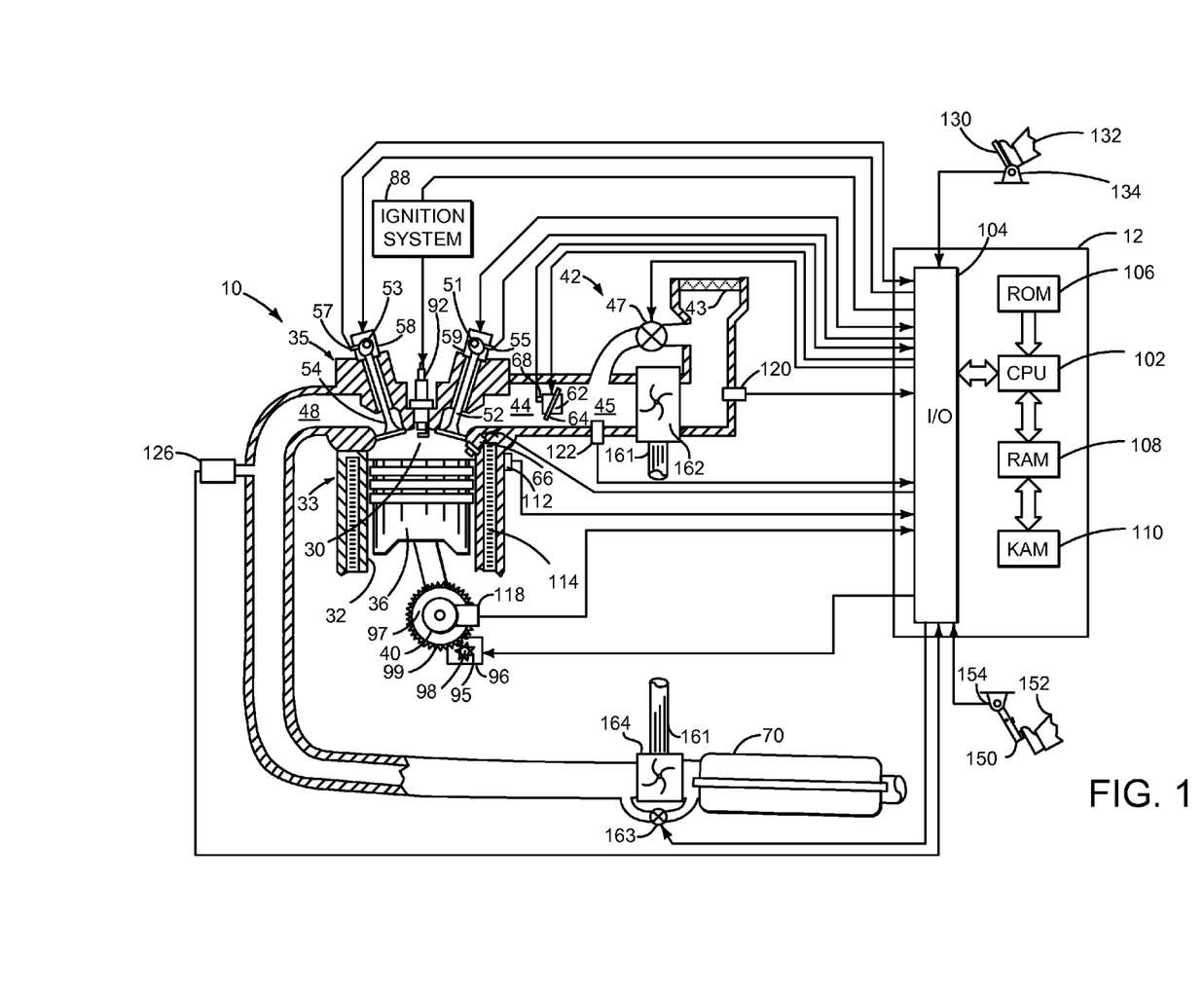
FIG. 1 is a schematic diagram of an engine.
Figure 2:
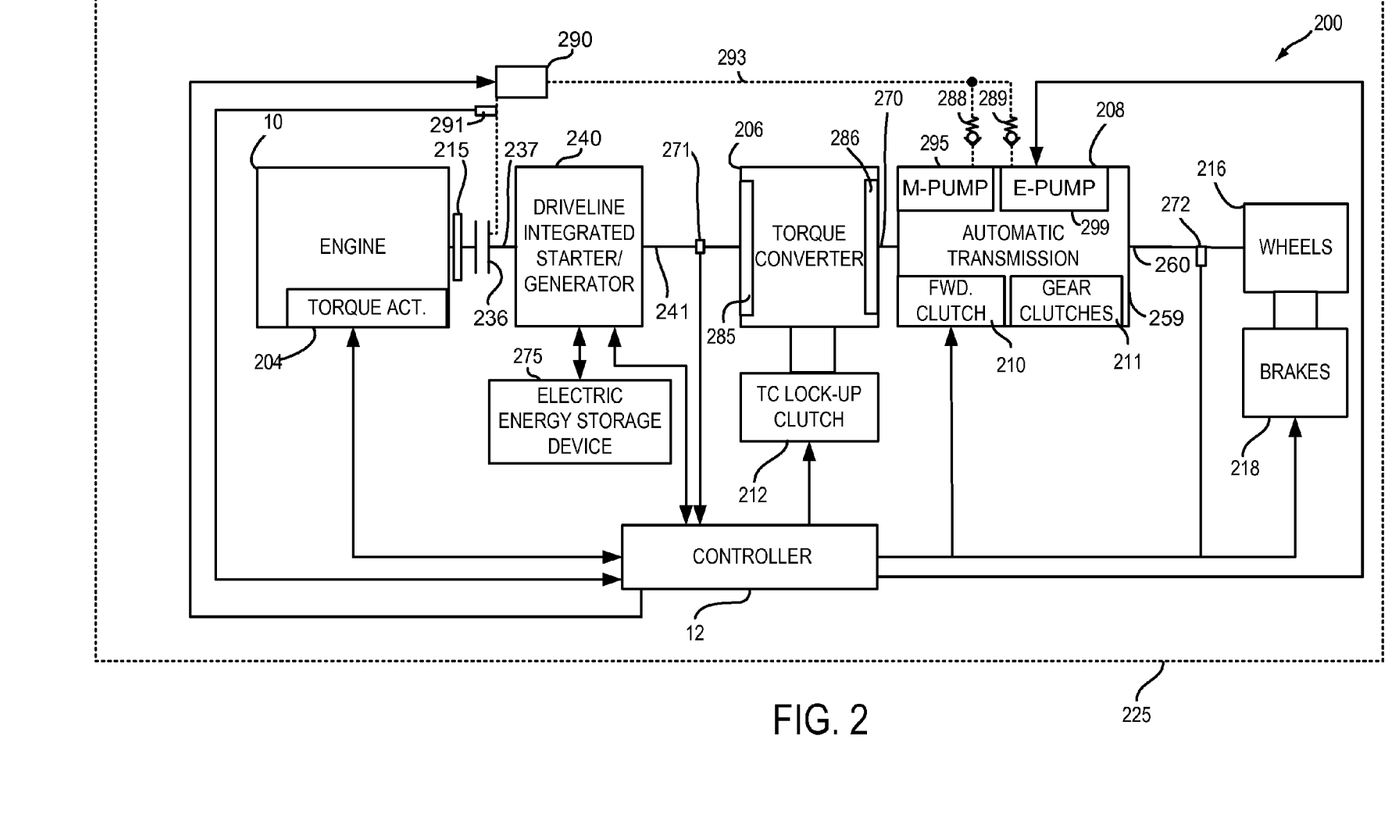
FIG. 2 is a schematic diagram of a hybrid vehicle driveline including the engine of FIG. 1.
Figure 3:
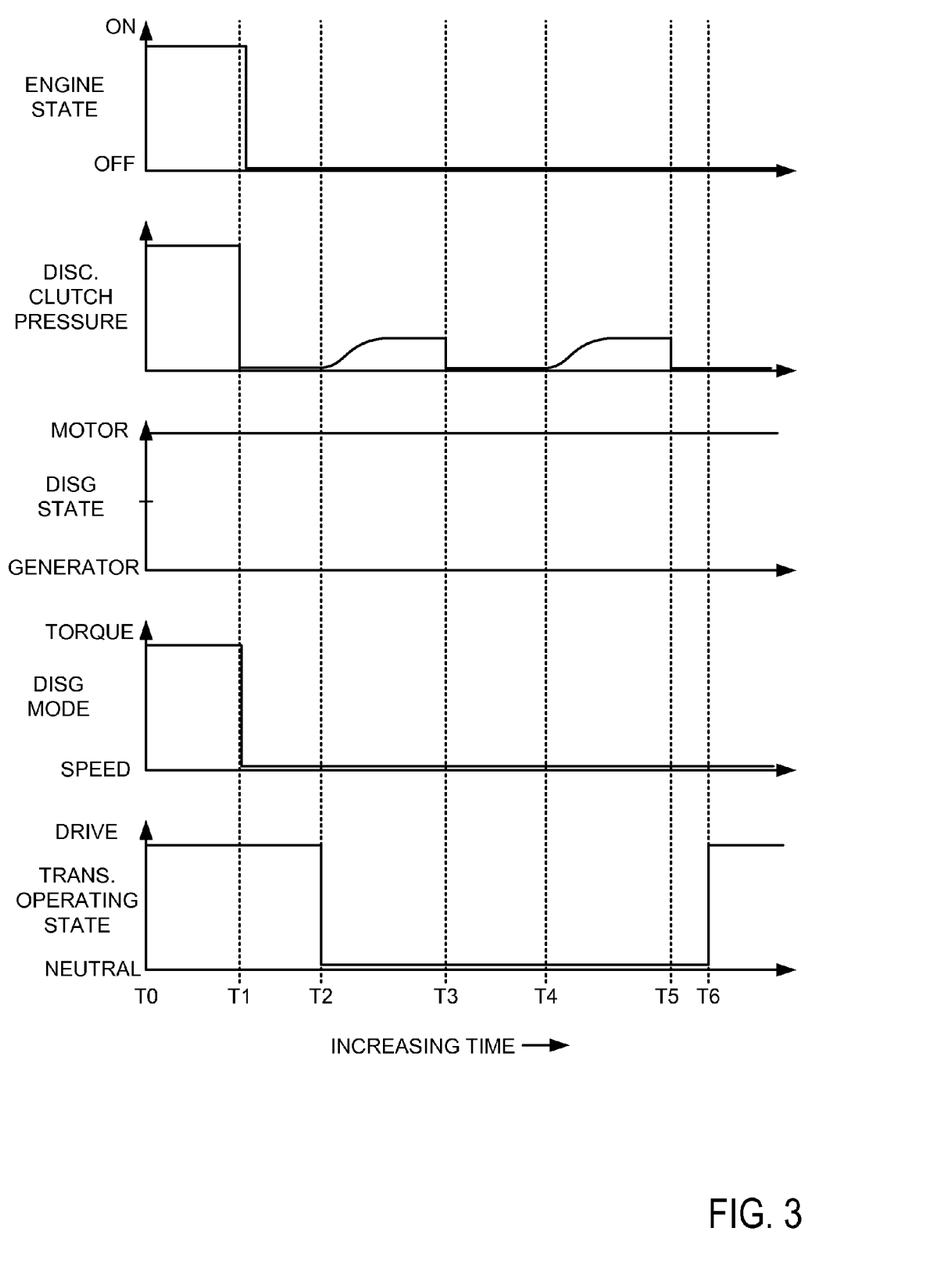
FIG. 3 is an example operating sequence for the hybrid driveline.
Figure 4:
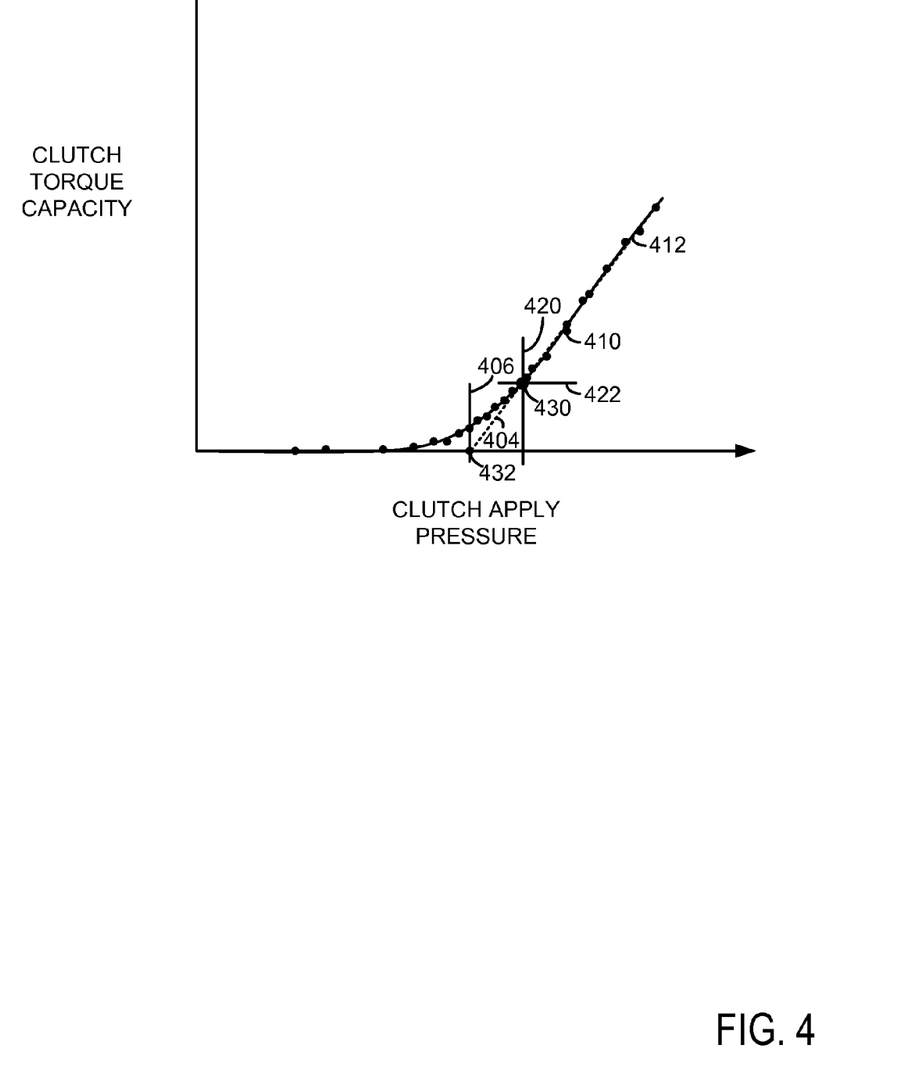
FIG. 4 is plot illustrating a way of determining driveline disconnect clutch stroke pressure.

The present description is related to characterizing and operating a driveline disconnect clutch of a hybrid vehicle. The hybrid vehicle may include an engine as is shown in FIG. 1. The engine of FIG. 1 may be included in a powertrain or driveline as is shown in FIG. 2. The driveline may be operated according to the sequence of FIG. 3 to characterize operation of a driveline disconnect clutch. FIG. 4 provides an illustration of a way to characterize operation of a driveline disconnect clutch. The method of FIG. 5 may be the basis for operating the driveline as is shown in FIG. 3.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be hydraulic and/or electro-mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a driveline 200. Hydraulic conduits or lines are shown by dotted lines. Electrical and mechanical connections are shown via solid lines.

The driveline of FIG. 2 includes engine 10 shown in FIG. 1. Driveline 200 may be powered by engine 10. Engine 10 may be started with an engine starting system shown in FIG. 1 or via driveline integrated starter/generator (DISG) 240. DISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

An engine output torque may be transmitted to an input side of driveline disconnect clutch 236 through dual mass flywheel 215. Disconnect clutch 236 may be electrically or hydraulically actuated. In this example, disconnect clutch 236 may be operated via fluid supplied from mechanically driven transmission fluid pump 295 or electrically driven transmission fluid pump 299. Check valves 288 and 289 allow fluid to flow from mechanically driven transmission fluid pump 295 and electrically driven transmission fluid pump 299 to variable force solenoid 290 via conduit 293. Check valves 288 and 289 also prevent fluid backflow to mechanically driven transmission fluid pump 295 and electrically driven transmission fluid pump 299. Pressure of fluid supplied to driveline disconnect clutch 236 is monitored by controller 12 via pressure sensor 291. The downstream side of disconnect clutch 236 is shown mechanically coupled to DISG input shaft 237.

DISG 240 may be operated to provide torque to driveline 200 or to convert driveline torque into electrical energy to be stored in electric energy storage device 275. DISG 240 has a higher output torque capacity than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 (e.g., high voltage battery or power source) may be a battery, capacitor, or inductor. The downstream side of DISG 240 is mechanically coupled to the impeller 285 of torque converter 206 via shaft 241. The upstream side of the DISG 240 is mechanically coupled to the disconnect clutch 236.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-6) 211 and forward clutch 210. The gear clutches 211 (e.g., 1-10) and the forward clutch 210 may be selectively engaged to propel a vehicle. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art. Controller 12 receives DISG position via position sensor 271 which also indicates the position of shaft 241 and mechanically driven transmission fluid pump 295. Controller 12 may convert transmission input shaft position into input shaft speed via differentiating a signal from position sensor 271. Controller 12 may receive transmission output shaft torque from torque sensor 272. Alternatively, sensor 272 may be a position sensor or torque and position sensors. If sensor 272 is a position sensor, controller 12 differentiates a position signal to determine transmission output shaft velocity. Controller 12 may also differentiate transmission output shaft velocity to determine transmission output shaft acceleration.

When idle-stop conditions are satisfied, controller 12 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. When engine restart conditions are satisfied, and/or a vehicle operator wants to launch the vehicle, controller 12 may reactivate engine 10 by cranking engine 10 and resuming cylinder combustion.

Thus, the system of FIG. 2 provides for a system, comprising: an engine; a motor; a disconnect clutch positioned in a driveline between the engine and the motor; a transmission coupled to the motor; and a controller including executable instructions stored in non-transitory memory for operating a driveline disconnect clutch via the controller in response to a clutch stroke pressure estimated from a driveline disconnect clutch gain, the driveline disconnect clutch gain based on a change in driveline disconnect clutch torque capacity divided by a change in driveline disconnect clutch apply pressure. The system further comprises additional instructions to operate the motor in a speed control mode while determining the clutch stroke pressure. The system includes where the transmission includes a torque converter clutch. The system further comprises additional instructions to open the torque converter clutch while determining the clutch stroke pressure. The system further comprises additional instructions to stop rotation of the engine while estimating the clutch stroke pressure. The system further comprises additional instructions to estimate driveline disconnect clutch torque capacity based on the driveline disconnect clutch gain and the clutch stroke pressure.

Referring now to FIG. 3, a driveline operating sequence is shown. The driveline operating sequence of FIG. 2 may be provided via the system of FIGS. 1 and 2. The driveline operating sequence may also be provided based on the method of FIG. 5.

The first plot from the top of FIG. 3 is a plot of engine operating state versus time. The vertical axis represents engine operating state (e.g., on—rotating and combusting air and fuel; or off—not rotating and not combusting air and fuel). The engine is off when the trace is at a lower level near the horizontal axis. The engine is on when the trace is at a higher level near the vertical axis arrow. The horizontal axis represents time and time increases from the left side of the plot to the right side of the plot.

The second plot from the top of FIG. 3 is a plot of driveline disconnect clutch application pressure of fluid supplied to the driveline disconnect clutch versus time. The driveline disconnect clutch pressure is equivalent to transmission line pressure or transmission pump outlet pressure when the variable force solenoid is commanded open. The vertical axis represents pressure of fluid supplied to the driveline disconnect clutch and pressure supplied to the driveline disconnect clutch increases in the direction of the vertical axis arrow. The driveline disconnect clutch is fully open when application pressure is near the horizontal axis. The driveline disconnect clutch is fully closed when application pressure is near the vertical axis arrow. The horizontal axis represents time and time increases from the left side of the plot to the right side of the plot.

The third plot from the top of FIG. 3 is a plot of driveline integrated starter/generator (DISG) state versus time. The vertical axis represents DISG state and DISG state may be motor or generator. The DISG provides positive torque to the driveline in motor mode and negative torque to the driveline in generator mode. The DISG is in motor mode when the trace is at a higher level near the vertical axis arrow. The DISG is in generator mode when the trace is at a lower level near the horizontal axis. The horizontal axis represents time and time increases from the left side of the plot to the right side of the plot.

The fourth plot from the top of FIG. 3 is a plot of DISG control mode versus time. The vertical axis represents DISG control mode. The DISG control mode may be speed or torque. In speed control mode, DISG torque is allowed to vary while DISG speed is adjusted to a desired speed. The desired speed may be constant or varying over time. In torque control mode, DISG speed is allowed to vary while DISG torque is adjusted to a desired torque. The desired torque may be constant or varying over time. The DISG is in torque control mode when the trace is at a higher level near the vertical axis arrow. The DISG is in speed control mode when the trace is at a lower level near the horizontal axis. The horizontal axis represents time and time increases from the left side of the plot to the right side of the plot.

The fifth plot from the top of FIG. 3 is a plot of transmission operating state versus time. The vertical axis represents transmission operating state. The transmission is in drive or a forward gear when the trace is at a higher level near the vertical axis arrow. The transmission is in park or neutral when the trace is at a lower level near the horizontal axis. The horizontal axis represents time and time increases from the left side of the plot to the right side of the plot.

At time T0, the engine is on and running, the drive line disconnect clutch is fully closed as indicated by the application pressure being at a high level. The DISG is operating as a motor in torque control mode and the transmission is in drive. Such conditions are indicative of the driveline propelling the vehicle down a road.

At time T1, the driveline disconnect clutch is opened by reducing driveline disconnect clutch application pressure and the DISG enters speed control mode. The driveline disconnect clutch may be opened in response to a request to determine driveline disconnect clutch control parameters, low driver demand torque, or other conditions. The DISG continues to operate as a motor and the transmission remains in drive. The engine is stopped a short time after the driveline disconnect clutch opens so that the reduction in engine torque does not create a driveline torque disturbance.

At time T2, conditions are as desired for determining driveline disconnect clutch control parameters so the transmission is shifted into neutral. Shifting the transmission to neutral allows the DISG speed to change without affecting vehicle speed or causing a driveline torque disturbance that may be observed by the driver. The DISC clutch application pressure is increased shortly after the transmission is shifted into neutral. The DISG torque and driveline disconnect clutch application pressure are stored to memory frequently as the driveline disconnect clutch application pressure is increased. The driveline disconnect clutch pressure is increased to determine a driveline disconnect clutch application pressure where torque begins to transfer from the DISG to the engine. Because the DISG is in speed control mode, DISG speed is maintained and DISG torque increases by an amount related to the driveline disconnect clutch coulomb friction and driveline disconnect clutch torque capacity. The driveline disconnect clutch application pressure may be increased to a predetermined level or until another predetermined condition such as the engine beginning to rotate occurs. The engine remains stopped and the DISG is prevented from entering generator mode while driveline disconnect clutch control parameters are being determined.

At time T3, the driveline disconnect clutch application pressure is decreased to fully open the driveline disconnect clutch. The driveline disconnect clutch application pressure may be decreased in response to the driveline disconnect clutch application pressure achieving a threshold pressure or another condition.

At time T4, the DISC clutch application pressure is increased a second time while the transmission is in neutral. The DISG torque and driveline disconnect clutch application pressure are stored to memory frequently as the driveline disconnect clutch application pressure is increased. The driveline disconnect clutch pressure is increased a second time to confirm and/or average the driveline disconnect clutch application pressure where torque begins to transfer from the DISG to the engine and the driveline disconnect clutch stroke pressure. The driveline disconnect clutch application pressure may be increased to a predetermined level or until another predetermined condition such as the engine beginning to rotate occurs. The engine remains stopped and the DISG is prevented from entering generator mode while driveline disconnect clutch control parameters are being determined.

At time T5, the driveline disconnect clutch application pressure is decreased to fully open the driveline disconnect clutch. The driveline disconnect clutch application pressure may be decreased in response to the driveline disconnect clutch application pressure achieving a threshold pressure or another condition.

At time T6, the driveline disconnect clutch control parameter determination sequence ends and the transmission is shifted from neutral to drive to prepare for vehicle launch. In some examples, if the driveline disconnect clutch control parameters are determined after a driver shifts the car into park, the transmission may remain in park. The determined driveline control parameters are a basis for estimating driveline disconnect clutch torque capacity and control after time T6.

In this way, driveline disconnect clutch control parameters may be determined without degrading driveline performance. Although not shown, driveline disconnect clutch control parameters may be determined when the vehicle is moving down a road and driver demand torque is low.

Referring now to FIG. 4, an exemplary graphic representation of one way to determine driveline disconnect clutch control parameters is shown. The vertical axis represents driveline disconnect clutch torque capacity and driveline disconnect clutch torque capacity increases in the direction of the vertical axis arrow. The horizontal axis represents driveline disconnect clutch apply pressure or a pressure of fluid supplied to the driveline disconnect clutch.

Data points 410 represent driveline disconnect clutch data stored during a driveline disconnect clutch control parameter determination sequence, such as the sequence shown in FIG. 3. Curve 412 is represents a regression of data points 410 into a curve described by a polynomial. Line 404 represents a driveline disconnect clutch gain line that is extended from non-zero data points greater than a threshold driveline disconnect clutch torque capacity 422 or driveline disconnect clutch apply pressure greater than a threshold driveline disconnect clutch application pressure 420 to zero driveline disconnect clutch torque capacity. The gain line slope may be determined as is described in the method of FIG. 5. The driveline disconnect clutch application pressure where line 404 intersects the horizontal axis is the driveline disconnect clutch stroke pressure indicated by line 406. Thus, line 404 is a straight line with a slope equivalent to the slope of curve 412 above or greater than the driveline disconnect clutch apply pressure at 420 and/or driveline disconnect clutch torque capacity at 422. Further, because driveline disconnect clutch apply pressure may be limited based on driveline disconnect clutch design, the slope of line 404 may be applicable for driveline disconnect clutch apply pressures below a second threshold pressure. Line 404 is extended from the driveline disconnect clutch application pressure or driveline disconnect clutch torque transfer capacity at 430 to the driveline disconnect clutch application pressure or driveline disconnect clutch torque transfer capacity at 432. Thus, the clutch stroke pressure may be based on extending a disconnect clutch gain line from a non-zero driveline disconnect clutch torque capacity to zero driveline disconnect clutch torque capacity.

It may be observed that there is a driveline disconnect clutch torque capacity difference between where line 404 intersects the horizontal axis and the driveline disconnect clutch torque capacity of curve 412 at a same driveline disconnect clutch application pressure. The intersection of line 404 at the horizontal axis may provide a more repeatable estimate of driveline disconnect clutch stroke pressure than the intersection of curve 412 and the horizontal axis because coulomb friction may vary from one clutch application to another clutch application. The driveline disconnect clutch gain may be more constant so that intersection of line 404 at the horizontal axis may be more repeatable.

Figure 5:
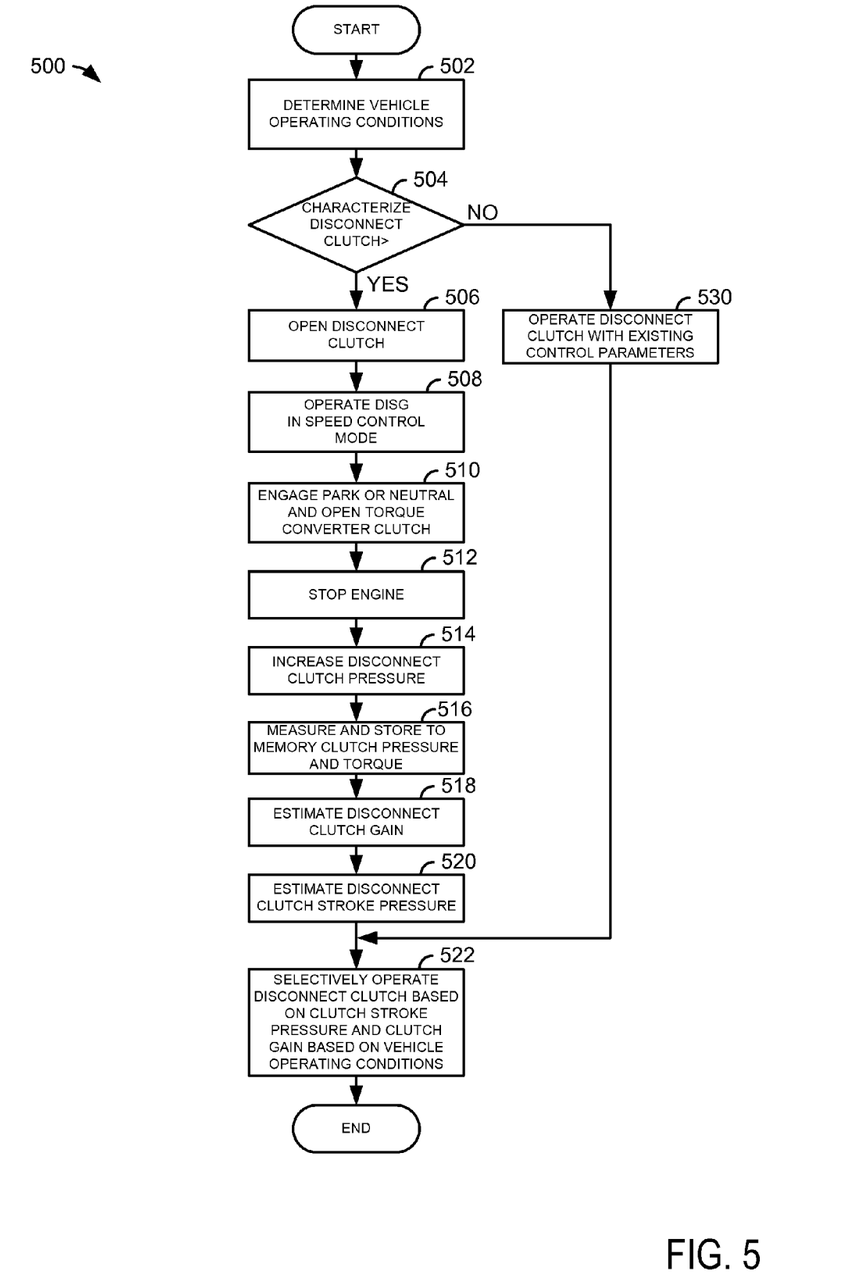
FIG. 5 is a method for operating the hybrid driveline.

Referring now to FIG. 5, a method for operating a driveline is shown. The method may be at least partially implemented as executable instructions stored in controller memory in the system of FIGS. 1 and 2. Further, the method may include actions taken in the physical world to transform an operating state of the system of FIGS. 1 and 2. Additionally, the method may provide the operating sequence shown in FIG. 3.

At 502, method 500 determines vehicle operating conditions. Vehicle operating conditions may be determined via receiving inputs as shown in FIGS. 1 and 2 into a controller. Vehicle operating conditions may include but are not limited to vehicle speed, engine speed, engine torque, driver demand torque, driveline disconnect clutch operating state, miles traveled by the vehicle, transmission operating state, driveline disconnect clutch application pressure, DISG speed, DISG torque, and ambient temperature. Method 500 proceeds to 504 after vehicle operating conditions are determined.

At 504, method 500 judges of conditions are met to characterize driveline disconnect clutch control parameters. Conditions may include but are not limited to the vehicle having traveled a predetermined distance, the driveline disconnect clutch having been applied a predetermined number of times, and driver demand torque being less than a threshold torque. If method 500 judges that conditions for characterizing driveline disconnect clutch control parameters have been met, the answer is yes and method 500 proceeds to 506. Otherwise, the answer is no and method 500 proceeds to 530.

At 530, method 500 continues to operate the driveline disconnect clutch with existing or present control parameters for driveline disconnect gain and stroke pressure. In other words, the control parameters are not adjusted. Method 500 proceeds to 522 after driveline disconnect clutch control parameters are maintained.

At 506, method 500 fully opens the driveline disconnect clutch by reducing driveline disconnect clutch application pressure. The driveline disconnect clutch may be supplied oil via a transmission pump. The oil supplied to the driveline disconnect clutch may stopped via closing a valve and driveline disconnect clutch application pressure may be reduced via opening a valve. Method 500 proceeds to 508 after the driveline disconnect clutch is opened.

At 508, method 500 operates the DISG in a speed control mode. The DISG speed may be held constant while the DISG torque is varied to hold DISG speed at the constant value. In one example, DISG speed is closed loop controlled to a constant speed based on measured or actual DISG speed. Method 500 proceeds to 510 after the DISG enters speed control mode.

At 510, method 500 commands a transmission in the hybrid vehicle driveline into neutral or park. By commanding the transmission into park or neutral, the DISG does not supply torque to the vehicle's wheels so that driveline disconnect clutch control parameters may be more accurately determined. Further, as discussed later in the method of FIG. 5, operating the transmission in neutral or park reduces torque converter impeller torque to near zero so that DISG torque may be more directly related to driveline disconnect clutch torque transfer capacity. Additionally, method 500 fully opens the torque converter clutch if it is not fully open. Method 500 proceeds to 512 after the transmission is shifted into park or neutral.

It should be mentioned that method 500 may be performed without shifting the transmission into park or neutral and maintaining the transmission in drive. However, the driveline disconnect clutch control parameter estimation may be improved by shifting the transmission to neutral or park. If the transmission is in drive, torque converter turbine impeller torque may be held constant by maintaining a constant amount of slip (e.g., speed difference between the torque converter impeller and torque converter turbine) across the torque converter and a constant torque converter clutch capacity while the DISG is maintained at a constant speed.

At 512, method 500 method 500 stops the engine from rotating. The engine may be stopped via stopping fuel flow to the engine. By stopping the engine, it may be possible to provide more repeatable driveline disconnect clutch torque transfer capacity estimates. Method 500 proceeds to 514 after the engine is stopped.

At 514, method 500 commands an increase in driveline disconnect clutch application pressure to stroke the driveline disconnect clutch and transfer DISG torque to the engine via the driveline disconnect clutch. In one example, the driveline disconnect clutch application pressure is increased to a threshold pressure, the threshold pressure less than a pressure to provide torque to rotate the engine at greater than a threshold speed. Method 500 proceeds to 516 after the driveline disconnect clutch application pressure begins to increase.

At 516, method 500 measures and stores driveline disconnect clutch application pressure and DISG torque to memory. The DISG torque along with an equation describing driveline torque, may be used to determine the driveline disconnect clutch gain and stroke pressure. The driveline disconnect clutch application pressure and DISG torque may be stored to memory at a predetermined rate (e.g., 100 Hz) as the driveline disconnect clutch application pressure is increased. Method 500 proceeds to 518 after data storage to memory begins.

At 518, method 500 estimates the driveline disconnect clutch gain. The driveline disconnect clutch gain is estimated by the following equation:

$$K_{clutch} = \frac{T_{high} - T_{low}}{P_{high} - P_{low}}$$

where $K_{clutch}$ is the driveline disconnect clutch gain, $T_{high}$ is first driveline disconnect clutch torque transfer capacity, $T_{low}$ is a second driveline disconnect clutch torque transfer capacity that is less than $T_{high}$, $P_{high}$ is a first driveline disconnect clutch application pressure, $P_{low}$ is a second driveline disconnect clutch application pressure amount less than $P_{high}$. The driveline disconnect clutch torque transfer capacities and application pressures are determined for driveline disconnect application pressures greater than a threshold pressure or for driveline disconnect clutch torque transfer capacities greater than a threshold driveline disconnect clutch torque transfer capacity. For example, if driveline disconnect clutch application pressure is increased to a pressure greater than a threshold pressure, $T_{low}$ is determined from DISG torque and $P_{low}$ is determined by measuring driveline disconnect clutch application pressure. Driveline disconnect clutch application pressure is increased again and $T_{high}$ is determined from DISG torque and $P_{high}$ is determined by measuring driveline disconnect clutch application pressure. The driveline disconnect clutch torque transfer capacities and driveline disconnect clutch application pressures are then input into the driveline disconnect clutch gain equation to determine the driveline disconnect clutch gain. The driveline disconnect clutch gain is also a slope of a straight line (e.g., 404 of FIG. 4) that describes a linear portion of a curve that describes driveline disconnect clutch torque transfer capacity versus driveline disconnect clutch application pressure as shown in FIG. 4. The driveline disconnect clutch torque transfer capacities and application pressures are determined above a threshold driveline disconnect clutch torque transfer capacity or application pressure to avoid determining values in a non-linear portion of the curve describing driveline disconnect clutch torque transfer capacity versus driveline disconnect clutch application pressure. Method 500 proceeds to 520 after the driveline disconnect clutch gain is determined.

At 520, method 500 estimates the driveline disconnect clutch stroke pressure. A driveline disconnect clutch torque transfer capacity to application pressure relationship may be described via the following equation:

$$T_{DCC} = mu(P_{apply} - P_{stroke})A_{clutch}R_{effective} = K_{clutch}(P_{apply} - P_{stroke})$$

where $T_{DCC}$ is driveline disconnect clutch torque transfer capacity, mu is the driveline disconnect clutch coefficient of friction, $A_{clutch}$ is effective area of the total number of clutch plates, Reffective is the effective radius of the clutch plates based on inner and outer clutch plate diameters, $P_{apply}$ is a driveline disconnect clutch pressure greater than the stroke pressure, $P_{stroke}$ is a driveline disconnect clutch pressure where the driveline disconnect torque transfer capacity begins to increase from a value of zero, and $K_{clutch}$ is the driveline disconnect clutch gain. Based on the driveline disconnect clutch torque capacity to application pressure equation and the driveline disconnect clutch gain equation, the stroke pressure may be determined by:

$$P_{stroke} = P_{high} - \frac{(T_{high} - T_{PO})}{K_{clutch}}$$

where $P_{stroke}$ is the stroke pressure and $T_{PO}$ is the driveline disconnect clutch torque capacity at the driveline disconnect clutch stroke pressure. $T_{PO}$ is zero at the driveline disconnect clutch stroke pressure. Thus, the driveline disconnect clutch stroke pressure is a pressure where a line described by the driveline disconnect clutch gain and driveline disconnect stroke pressure intersects a horizontal axis as shown in FIG. 4. Thus, the equation of the line describing driveline disconnect clutch operation is y=mx+b where y is driveline disconnect clutch torque transfer capacity, x is driveline disconnect clutch application pressure, m is $K_{clutch}$, and b is $P_{stroke}$. The stroke pressure is a pressure above which the driveline disconnect clutch begins increasing the driveline disconnect clutch's torque transfer capacity. Method 500 proceeds to 522 after the driveline disconnect clutch stroke pressure is determined.

At 522, method 500 selectively operates the driveline disconnect clutch based on the driveline disconnect clutch stroke pressure and the driveline disconnect clutch gain. Further, torque transfer capacity of the driveline disconnect clutch may be estimated based on the driveline disconnect clutch gain and driveline disconnect clutch stroke pressured. For example, if 20 N-m of engine cranking torque are desired to crank the engine via the DISG through the driveline disconnect clutch and the driveline disconnect stroke pressure is known to be X kPa and the driveline disconnect clutch gain is Y N-m/kPa, the desired driveline disconnect clutch application pressure may be determined based on the equation of a straight line described earlier. The determined driveline disconnect clutch application pressure is then commanded via adjusting a position of a valve. Likewise, if driveline disconnect application pressure is determined to be X1 kPA, driveline disconnect stroke pressure is X kPa, and driveline disconnect clutch gain is Y N-m/kPa, driveline disconnect clutch torque transfer capacity may be determined based on the equation of a straight line described earlier. The determined driveline disconnect clutch torque transfer capacity may be used as a basis for controlling the DISG current and torque. Method 500 proceeds to exit after the driveline disconnect clutch is operated according to the stroke pressure and driveline disconnect clutch gain.

Thus, the method of FIG. 5 provides for a driveline operating method, comprising: receiving inputs to a controller; operating a driveline disconnect clutch via the controller in response to a clutch stroke pressure, the clutch stroke pressure based on extending a disconnect clutch gain line from a non-zero driveline disconnect clutch torque capacity to zero driveline disconnect clutch torque capacity (or within a predetermined torque of zero driveline disconnect clutch torque capacity). The method includes where the non-zero driveline disconnect clutch torque capacity is a torque capacity greater than a threshold driveline disconnect clutch torque capacity. The method includes where the non-zero driveline disconnect clutch torque capacity is a torque capacity about which driveline disconnect clutch torque capacity has a substantially constant (e.g., varies by less than ten percent) gain. The method includes where the gain line is based on the inputs to the controller. The method includes where the inputs include DISG torque. The method includes where the inputs include driveline disconnect clutch application pressure. The method further comprises estimating driveline disconnect clutch torque capacity based on the clutch stroke pressure and a driveline disconnect clutch gain.

In some examples, the method of FIG. 5 provides for a driveline operating method, comprising: operating a driveline integrated starter/generator (DISG) in a speed control mode; increasing a driveline disconnect clutch apply pressure while the DISG is in the speed control mode; receiving inputs to a controller while increasing the driveline disconnect clutch apply pressure; and operating a driveline disconnect clutch via the controller in response to a clutch stroke pressure, the clutch stroke pressure based on extending a disconnect clutch gain line from a non-zero driveline disconnect clutch torque capacity to zero driveline disconnect clutch torque capacity (or within a predetermined torque of zero driveline disconnect clutch torque capacity). The method includes where a torque converter clutch is open while increasing the driveline disconnect clutch apply pressure.

In some examples, the method further comprises preventing the DISG from entering a generator mode while increasing the driveline disconnect clutch apply pressure. The method includes where an engine in a driveline including the DISG is not rotating. The method includes where the clutch gain line is based on driveline disconnect clutch application pressures greater than a threshold pressure. The method includes where the inputs include DISG torque and driveline disconnect clutch application pressure. The method further comprises placing a transmission in neutral or park while increasing the driveline disconnect apply pressure.

Note that the example control and estimation routines included herein can be used with various engine and/or vehicle system configurations. Further, the methods described herein may be a combination of actions taken by a controller in the physical world and instructions within the controller. At least portions of the control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A driveline operating method, comprising:
    receiving inputs to a controller;
    operating a driveline disconnect clutch via the controller in response to a clutch stroke pressure, the clutch stroke pressure based on a clutch pressure minus a value, the value based on a first clutch torque transfer capacity change divided by a ratio of a second clutch torque transfer capacity change to pressure change.

2. The method of claim 1, further comprising determining a driveline disconnect clutch torque transfer capacity from the clutch stroke pressure.

3. The method of claim 2, where the driveline disconnect clutch torque transfer capacity is further based on a driveline disconnect clutch application pressure.

4. The method of claim 1, where the clutch stroke pressure is based on the inputs to the controller.

5. The method of claim 4, where the inputs include DISG torque.

6. The method of claim 5, where the inputs include driveline disconnect clutch application pressure.

7. The method of claim 1, further comprising shifting a transmission into park or neutral.

8. A driveline operating method, comprising:
    operating a driveline integrated starter/generator (DISG) in a speed control mode;
    increasing a driveline disconnect clutch apply pressure while the DISG is in the speed control mode;
    receiving inputs to a controller while increasing the driveline disconnect clutch apply pressure; and
    operating a driveline disconnect clutch via the controller in response to a clutch stroke pressure, the clutch stroke pressure based on a clutch pressure minus a value, the value based on a first clutch torque transfer capacity change divided by ratio of a second clutch torque transfer capacity change to pressure change.

9. The method of claim 8, where a torque converter clutch is open while increasing the driveline disconnect clutch apply pressure.

10. The method of claim 8, further comprising preventing the DISG from entering a generator mode while increasing the driveline disconnect clutch apply pressure.

11. The method of claim 8, where an engine in a driveline including the DISG is not rotating.

12. The method of claim 8, further comprising determining a driveline disconnect clutch torque transfer capacity from the clutch stroke pressure.

13. The method of claim 8, where the inputs include DISG torque and driveline disconnect clutch application pressure.

14. The method of claim 8, further comprising placing a transmission in neutral or park while increasing the driveline disconnect clutch apply pressure.

15. A system, comprising:
   an engine;
   a motor;
   a disconnect clutch positioned in a driveline between the engine and the motor;
   a transmission coupled to the motor; and
   a controller including executable instructions stored in non-transitory memory for operating a driveline disconnect clutch via the controller in response to a clutch stroke pressure estimated from a driveline disconnect clutch gain, the driveline disconnect clutch gain based on a change in driveline disconnect clutch torque capacity divided by a change in driveline disconnect clutch apply pressure.

16. The system of claim 15, further comprising additional instructions to operate the motor in a speed control mode while determining the clutch stroke pressure.

17. The system of claim 15, where the transmission includes a torque converter clutch.

18. The system of claim 17, further comprising additional instructions to open the torque converter clutch while determining the clutch stroke pressure.

19. The system of claim 15, further comprising additional instructions to stop rotation of the engine while estimating the clutch stroke pressure.

20. The system of claim 15, further comprising additional instructions to shift the transmission into neutral or park.

\* \* \* \* \*

UNITED STATES PATENT AND TRADEMARK OFFICE
CERTIFICATE OF CORRECTION

PATENT NO. : 9,527,505 B1
APPLICATION NO. : 14/744990
DATED : December 27, 2016
INVENTOR(S) : Alexander O'Connor Gibson et al.

Page 1 of 1

It is certified that error appears in the above-identified patent and that said Letters Patent is hereby corrected as shown below:

In the Claims

Column 14, Line 58, Claim 8, insert --a-- following "change divided by".

Signed and Sealed this
Fourth Day of April, 2017

Michelle K. Lee
*Director of the United States Patent and Trademark Office*